(12) United States Patent
Petersen

(10) Patent No.: US 10,890,730 B2
(45) Date of Patent: Jan. 12, 2021

(54) FIBER OPTIC CABLE CLAMP AND CLAMP ASSEMBLY

(71) Applicant: COMMSCOPE TECHNOLOGIES LLC, Hickory, NC (US)

(72) Inventor: Cyle D. Petersen, Belle Plaine, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/329,150

(22) PCT Filed: Aug. 25, 2017

(86) PCT No.: PCT/US2017/048699
§ 371 (c)(1),
(2) Date: Feb. 27, 2019

(87) PCT Pub. No.: WO2018/044729
PCT Pub. Date: Mar. 8, 2018

(65) Prior Publication Data
US 2019/0204524 A1 Jul. 4, 2019

Related U.S. Application Data

(60) Provisional application No. 62/381,959, filed on Aug. 31, 2016.

(51) Int. Cl.
*G02B 6/44* (2006.01)
(52) U.S. Cl.
CPC ......... *G02B 6/4471* (2013.01); *G02B 6/4439* (2013.01)

(58) Field of Classification Search
None
See application file for complete search history.

(56) References Cited

U.S. PATENT DOCUMENTS

| | | |
|---|---|---|
| 4,299,244 A | 11/1981 | Hirai |
| 4,351,579 A | 9/1982 | Kordes et al. |
| 4,435,612 A | 3/1984 | Smith |
| 4,441,786 A | 4/1984 | Hulin et al. |
| 4,453,291 A | 6/1984 | Fidych |
| 4,461,529 A | 7/1984 | Fariss |
| 4,582,067 A | 4/1986 | Silverstein et al. |
| 4,650,933 A | 3/1987 | Benda et al. |
| 4,684,211 A | 8/1987 | Weber et al. |
| 4,768,961 A | 9/1988 | Lau |

(Continued)

FOREIGN PATENT DOCUMENTS

| | | |
|---|---|---|
| AT | 408 698 B | 2/2002 |
| CN | 1289930 C | 12/2006 |

(Continued)

OTHER PUBLICATIONS

International Search Report and Written Opinion of the International Searching Authority for International Patent Application No. PCT/US2017/048699 dated Dec. 8, 2017, 13 pages.

(Continued)

*Primary Examiner* — Jerry Rahll
(74) *Attorney, Agent, or Firm* — Merchant & Gould P.C.

(57) ABSTRACT

The present disclosure relates to fiber optic cable clamps and fiber optic cable clamp assemblies that includes cable clamps having bracket slots that receive bracket arms for securing a plurality of cable fan-outs at or near their point of connection to telecommunications equipment.

25 Claims, 7 Drawing Sheets

(56) References Cited

U.S. PATENT DOCUMENTS

| | | |
|---|---|---|
| 4,770,639 A | 9/1988 | Lau |
| 4,775,121 A | 10/1988 | Carty |
| 4,791,245 A | 12/1988 | Thornley |
| 4,797,114 A | 1/1989 | Lau |
| 4,820,200 A | 4/1989 | Lau |
| 4,840,568 A | 6/1989 | Burroughs et al. |
| 4,917,491 A | 4/1990 | Ring et al. |
| 5,083,346 A | 1/1992 | Orton |
| 5,133,583 A | 7/1992 | Wagman et al. |
| 5,146,532 A | 9/1992 | Hodge |
| 5,189,410 A | 2/1993 | Kosugi et al. |
| 5,199,878 A | 4/1993 | Dewey et al. |
| 5,214,673 A | 5/1993 | Morgenstern et al. |
| 5,231,688 A | 7/1993 | Zimmer |
| 5,278,831 A | 1/1994 | Mabey et al. |
| 5,317,663 A | 5/1994 | Beard et al. |
| 5,339,379 A | 8/1994 | Kutsch et al. |
| 5,363,465 A | 11/1994 | Korkowski et al. |
| 5,381,501 A | 1/1995 | Cardinal et al. |
| 5,393,249 A | 2/1995 | Morgenstern et al. |
| 5,416,874 A | 5/1995 | Giebel et al. |
| 5,432,875 A | 7/1995 | Korkowski et al. |
| 5,467,062 A | 11/1995 | Burroughs |
| 5,473,718 A | 12/1995 | Sommer |
| 5,497,444 A | 3/1996 | Wheeler |
| 5,514,128 A | 5/1996 | Hillsman et al. |
| 5,554,026 A | 9/1996 | Van Hale |
| 5,582,525 A | 12/1996 | Louwagie et al. |
| 5,598,500 A | 1/1997 | Crespel |
| 5,613,030 A | 3/1997 | Hoffer et al. |
| 5,627,925 A | 5/1997 | Alferness et al. |
| 5,645,519 A | 7/1997 | Lee et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,754,725 A | 5/1998 | Kuder et al. |
| 5,863,083 A | 1/1999 | Glebel et al. |
| 5,915,055 A | 6/1999 | Bennett et al. |
| 5,946,440 A | 8/1999 | Puetz |
| 5,970,195 A | 10/1999 | Brown |
| 6,072,932 A | 6/2000 | Bennett et al. |
| 6,104,855 A | 8/2000 | Jeon |
| 6,116,961 A | 9/2000 | Henneberger et al. |
| 6,208,796 B1 | 3/2001 | Vigliaturo |
| 6,226,111 B1 | 5/2001 | Chang et al. |
| 6,259,851 B1 | 7/2001 | Daoud |
| 6,263,136 B1 | 7/2001 | Jennings et al. |
| 6,307,998 B2 | 10/2001 | Vigliaturo |
| 6,328,608 B1 | 12/2001 | Olson et al. |
| 6,363,183 B1 | 3/2002 | Koh |
| 6,363,198 B1 | 3/2002 | Braga et al. |
| 6,370,294 B1 | 4/2002 | Pfeiffer et al. |
| 6,389,214 B1 | 5/2002 | Smith et al. |
| 6,418,262 B1 | 7/2002 | Puetz et al. |
| 6,421,493 B1 | 7/2002 | Burek et al. |
| 6,424,781 B1 | 7/2002 | Puetz et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,571,048 B1 | 5/2003 | Bechamps et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,614,979 B2 | 9/2003 | Bourdeau |
| 6,616,459 B2 | 9/2003 | Norris |
| 6,623,173 B1 | 9/2003 | Grois et al. |
| 6,632,106 B2 | 10/2003 | Musolf et al. |
| RE38,311 E | 11/2003 | Wheeler |
| 6,647,197 B1 | 11/2003 | Marrs et al. |
| 6,655,848 B2 | 12/2003 | Simmons et al. |
| 6,668,108 B1 | 12/2003 | Helkey et al. |
| 6,688,780 B2 | 2/2004 | Duran |
| 6,719,382 B2 | 4/2004 | Sucharczuk et al. |
| 6,738,555 B1 | 5/2004 | Cooke et al. |
| 6,760,531 B1 | 7/2004 | Solheid et al. |
| 6,761,594 B2 | 7/2004 | Johnsen et al. |
| 6,810,193 B1 | 10/2004 | Muller |
| 6,814,620 B1 | 11/2004 | Wu |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,867,668 B1 | 3/2005 | Dagostino et al. |
| 6,873,772 B2 | 3/2005 | Nakaya |
| 6,885,798 B2 | 4/2005 | Zimmel |
| 6,890,187 B2 | 5/2005 | Norris |
| 6,909,828 B2 | 6/2005 | Zimmel et al. |
| 6,937,807 B2 | 8/2005 | Franklin et al. |
| 6,983,095 B2 | 1/2006 | Reagan et al. |
| 6,993,237 B2 | 1/2006 | Cooke et al. |
| 7,029,322 B2 | 4/2006 | Ernst et al. |
| 7,035,510 B2 | 4/2006 | Zimmel et al. |
| 7,118,284 B2 | 10/2006 | Nakajima et al. |
| 7,121,732 B2 | 10/2006 | Pimpinella et al. |
| 7,142,764 B2 | 11/2006 | Allen et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,221,832 B2 | 5/2007 | Tinucci |
| 7,233,731 B2 | 6/2007 | Solheid et al. |
| 7,269,319 B2 | 9/2007 | Zimmel |
| 7,270,485 B1 | 9/2007 | Robinson et al. |
| 7,277,614 B2 | 10/2007 | Cody et al. |
| 7,280,725 B2 | 10/2007 | Brown et al. |
| 7,303,220 B2 | 12/2007 | Zellak |
| 7,310,474 B2 | 12/2007 | Kanaski et al. |
| 7,333,606 B1 | 2/2008 | Swam et al. |
| 7,346,254 B2 | 3/2008 | Kramer et al. |
| 7,349,616 B1 | 3/2008 | Castonguay et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,418,181 B2 | 8/2008 | Zimmel et al. |
| 7,418,186 B1 | 8/2008 | Grubish et al. |
| 7,440,669 B2 | 10/2008 | Tinucci |
| 7,453,706 B2 | 11/2008 | Clark et al. |
| 7,470,068 B2 | 12/2008 | Kahle et al. |
| 7,485,806 B1 | 2/2009 | Gretz |
| 7,495,931 B2 | 2/2009 | Clark et al. |
| 7,499,622 B2 | 3/2009 | Castonguay et al. |
| 7,606,459 B2 | 10/2009 | Zimmel et al. |
| 7,636,507 B2 | 12/2009 | Lu et al. |
| 7,641,396 B2 | 1/2010 | Feldner |
| 7,664,363 B1 | 2/2010 | Mowery, Sr. |
| 7,711,236 B2 | 5/2010 | Gonzalez et al. |
| 7,738,759 B2 | 6/2010 | Parikh et al. |
| 7,748,911 B2 | 7/2010 | Keenum et al. |
| 7,853,112 B2 | 12/2010 | Zimmel et al. |
| 7,885,505 B2 | 2/2011 | Zimmel |
| 7,912,336 B2 | 3/2011 | Zimmel |
| 7,933,484 B2 | 4/2011 | Hetzer et al. |
| 8,081,857 B2 | 12/2011 | Nair et al. |
| 8,172,465 B2 | 5/2012 | Kleeberger |
| 8,290,333 B2 | 10/2012 | Barlowe et al. |
| 8,346,045 B2 | 1/2013 | Zimmel et al. |
| 8,380,036 B2 | 2/2013 | Smith et al. |
| 8,573,855 B2 | 11/2013 | Nhep |
| 8,577,199 B2 | 11/2013 | Pierce et al. |
| 8,620,130 B2 | 12/2013 | Cooke et al. |
| 8,705,930 B2 | 4/2014 | Lu et al. |
| 8,737,786 B1 | 5/2014 | Compton et al. |
| 8,798,428 B2 | 8/2014 | Zimmel et al. |
| 8,824,850 B2 | 9/2014 | Garcia et al. |
| 9,140,872 B2 | 9/2015 | Sedor et al. |
| 9,151,923 B2 | 10/2015 | Nielson et al. |
| 9,395,509 B2 | 7/2016 | Petersen et al. |

(56) References Cited

U.S. PATENT DOCUMENTS

| | | |
|---|---|---|
| 10,054,753 B2 | 8/2018 | Petersen et al. |
| 2002/0062978 A1 | 5/2002 | Sakabe et al. |
| 2002/0131750 A1 | 9/2002 | Holman et al. |
| 2002/0141724 A1 | 10/2002 | Ogawa et al. |
| 2002/0181896 A1 | 12/2002 | McClellan et al. |
| 2003/0031423 A1 | 2/2003 | Zimmel |
| 2003/0031437 A1 | 2/2003 | Simmons et al. |
| 2003/0081916 A1 | 5/2003 | Norris |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0169974 A1 | 9/2003 | Ngo |
| 2003/0185535 A1 | 10/2003 | Tinucci et al. |
| 2003/0202765 A1 | 10/2003 | Franklin et al. |
| 2003/0210875 A1 | 11/2003 | Wagner et al. |
| 2004/0094605 A1 | 5/2004 | Wild et al. |
| 2004/0126069 A1 | 7/2004 | Jong et al. |
| 2004/0156609 A1 | 8/2004 | Lanier et al. |
| 2004/0161970 A1 | 8/2004 | Wlos et al. |
| 2004/0184748 A1 | 9/2004 | Clatanoff et al. |
| 2004/0240826 A1 | 12/2004 | Daoud et al. |
| 2004/0266273 A1 | 12/2004 | Wu |
| 2005/0002633 A1 | 1/2005 | Solheid et al. |
| 2005/0003707 A1 | 1/2005 | Wu |
| 2005/0041926 A1 | 2/2005 | Elkins, II et al. |
| 2005/0053341 A1 | 3/2005 | Zimmel |
| 2005/0058402 A1 | 3/2005 | Ernst et al. |
| 2005/0067847 A1 | 3/2005 | Zellak |
| 2005/0105873 A1 | 5/2005 | Reagan et al. |
| 2005/0105879 A1 | 5/2005 | Kanasaki et al. |
| 2005/0111811 A1 | 5/2005 | Cooke et al. |
| 2005/0167147 A1 | 8/2005 | Marsac et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2005/0265668 A1 | 12/2005 | Martin |
| 2005/0281526 A1 | 12/2005 | Vongseng et al. |
| 2006/0083468 A1 | 4/2006 | Kahle et al. |
| 2006/0093301 A1 | 5/2006 | Zimmel et al. |
| 2006/0120672 A1 | 6/2006 | Cody et al. |
| 2006/0153516 A1 | 7/2006 | Napiorkowski et al. |
| 2006/0169469 A1 | 8/2006 | Eastwood et al. |
| 2006/0188210 A1 | 8/2006 | Zimmel |
| 2006/0233508 A1 | 10/2006 | Mann et al. |
| 2006/0269198 A1 | 11/2006 | Blazer et al. |
| 2006/0269205 A1 | 11/2006 | Zimmel |
| 2006/0269206 A1 | 11/2006 | Zimmel |
| 2006/0285807 A1 | 12/2006 | Lu et al. |
| 2007/0036503 A1 | 2/2007 | Solheid et al. |
| 2007/0047893 A1 | 3/2007 | Kramer et al. |
| 2007/0117437 A1 | 5/2007 | Boehnlein et al. |
| 2007/0147765 A1 | 6/2007 | Gniadek et al. |
| 2007/0172172 A1 | 7/2007 | Theuerkorn et al. |
| 2007/0189692 A1 | 8/2007 | Zimmel et al. |
| 2007/0212004 A1 | 9/2007 | Lu et al. |
| 2008/0026647 A1 | 1/2008 | Boehnlein et al. |
| 2008/0063351 A1 | 3/2008 | Elkins et al. |
| 2008/0124039 A1 | 5/2008 | Gniadek et al. |
| 2008/0138020 A1 | 6/2008 | Robinson et al. |
| 2008/0138026 A1 | 6/2008 | Yow et al. |
| 2008/0164059 A1 | 7/2008 | Cipolla |
| 2008/0175541 A1 | 7/2008 | Lu et al. |
| 2008/0248673 A1 | 10/2008 | Boehnlein et al. |
| 2008/0253730 A1 | 10/2008 | Cox et al. |
| 2008/0317415 A1 | 12/2008 | Hendrickson et al. |
| 2009/0022468 A1 | 1/2009 | Zimmel |
| 2009/0022469 A1 | 1/2009 | Zimmel et al. |
| 2009/0035987 A1 | 2/2009 | Daly et al. |
| 2009/0060421 A1 | 3/2009 | Parikh et al. |
| 2009/0067804 A1 | 3/2009 | Knorr et al. |
| 2009/0103881 A1 | 4/2009 | Gonzalez et al. |
| 2009/0116806 A1 | 5/2009 | Zimmel et al. |
| 2009/0196553 A1 | 8/2009 | Anderson et al. |
| 2010/0027942 A1 | 2/2010 | Smith et al. |
| 2010/0030033 A1 | 2/2010 | Farley et al. |
| 2010/0054860 A1 | 3/2010 | Thompson et al. |
| 2010/0059229 A1 | 3/2010 | Smith et al. |
| 2010/0086260 A1 | 4/2010 | Parikh et al. |
| 2010/0092136 A1 | 4/2010 | Nhep |
| 2010/0150504 A1 | 6/2010 | Allen et al. |
| 2010/0158464 A1 | 6/2010 | Zimmel et al. |
| 2010/0215331 A1 | 8/2010 | Gonzalez et al. |
| 2010/0266244 A1 | 10/2010 | Lu et al. |
| 2011/0024103 A1 | 2/2011 | Storm et al. |
| 2011/0081121 A1 | 4/2011 | Le Dissez |
| 2011/0164853 A1 | 7/2011 | Corbille et al. |
| 2011/0182558 A1 | 7/2011 | Garcia et al. |
| 2011/0229098 A1 | 9/2011 | Abernathy et al. |
| 2011/0257563 A1 | 10/2011 | Thapliyal et al. |
| 2011/0262084 A1 | 10/2011 | Ott |
| 2011/0284285 A1 | 11/2011 | Miura et al. |
| 2011/0317975 A1 | 12/2011 | Lu et al. |
| 2012/0008909 A1 | 1/2012 | Mertesdorf et al. |
| 2012/0045178 A1 | 2/2012 | Theuerkorn |
| 2012/0186845 A1 | 7/2012 | Eshima et al. |
| 2012/0230636 A1 | 9/2012 | Blockley et al. |
| 2012/0301090 A1 | 11/2012 | Cline et al. |
| 2012/0328253 A1 | 12/2012 | Hurley et al. |
| 2013/0011105 A1 | 1/2013 | Barlowe et al. |
| 2013/0077928 A1 | 3/2013 | Hsing |
| 2013/0114937 A1 | 5/2013 | Zimmel et al. |
| 2013/0183012 A1 | 7/2013 | Cabanne Lopez et al. |
| 2013/0209042 A1 | 8/2013 | Belenky et al. |
| 2013/0209043 A1 | 8/2013 | Norris et al. |
| 2013/0294735 A1 | 11/2013 | Burris et al. |
| 2013/0330967 A1 | 12/2013 | Youtsey |
| 2014/0083229 A1 | 3/2014 | Kume |
| 2014/0093217 A1 | 4/2014 | Lu et al. |
| 2014/0126873 A1 | 5/2014 | Cooke et al. |
| 2014/0140664 A1 | 5/2014 | Islam |
| 2014/0140671 A1 | 5/2014 | Islam |
| 2014/0219621 A1 | 8/2014 | Barnette, Jr. et al. |
| 2014/0233903 A1 | 8/2014 | Valderrabano |
| 2014/0241674 A1 | 8/2014 | Isenhour et al. |
| 2014/0248798 A1 | 9/2014 | Youtsey |
| 2015/0078720 A1 | 3/2015 | Sedor et al. |
| 2015/0110442 A1 | 4/2015 | Zimmel et al. |
| 2015/0168657 A1 | 6/2015 | Islam |
| 2015/0260936 A1 | 9/2015 | Newbury et al. |
| 2015/0284036 A1 | 10/2015 | Miles |
| 2015/0370029 A1 | 12/2015 | Petersen et al. |
| 2016/0004016 A1 | 1/2016 | Zimmel et al. |
| 2016/0139355 A1 | 5/2016 | Petersen |
| 2016/0178850 A1 | 6/2016 | Nhep |
| 2016/0363733 A1 | 12/2016 | Nielson et al. |
| 2017/0102506 A1 | 4/2017 | Newbury et al. |
| 2017/0212313 A1 | 7/2017 | Elenabaas et al. |
| 2017/0269319 A1 | 9/2017 | Miller |
| 2018/0149823 A1 | 5/2018 | Wang et al. |
| 2018/0196211 A1 | 7/2018 | Agata et al. |
| 2019/0004272 A1 | 1/2019 | Field |
| 2019/0056562 A1 | 2/2019 | Petersen |

FOREIGN PATENT DOCUMENTS

| | | |
|---|---|---|
| DE | 41 30 706 A1 | 3/1993 |
| DE | 44 05 459 A1 | 8/1995 |
| DE | 202 01 170 U1 | 5/2002 |
| DE | 102 07 337 A1 | 11/2002 |
| DE | 10 2004 019 805 A1 | 11/2005 |
| DE | 20 2006 006 016 U1 | 8/2006 |
| DE | 10 2007 009 223 A1 | 8/2008 |
| EP | 0 202 994 A1 | 11/1986 |
| EP | 0 339 791 A1 | 11/1989 |
| EP | 0 355 639 A2 | 2/1990 |
| EP | 0 490 698 A1 | 6/1992 |
| EP | 0 646 811 A2 | 4/1995 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 245 980 A2 | 10/2002 |
| EP | 1 388 020 A1 | 2/2004 |

(56) References Cited

FOREIGN PATENT DOCUMENTS

| EP | 1 473 578 A2 | 11/2004 |
|---|---|---|
| EP | 1 589 361 A1 | 10/2005 |
| GB | 1129287 A | 10/1968 |
| GB | 2 300 978 A | 11/1996 |
| JP | H01-317824 A | 12/1989 |
| WO | 96/36896 A1 | 11/1996 |
| WO | 00/75706 A2 | 12/2000 |
| WO | 02/39170 A2 | 5/2002 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |
| WO | 2010/042507 A1 | 4/2010 |
| WO | 2015/200321 A1 | 12/2015 |
| WO | 2015/200327 A1 | 12/2015 |
| WO | 2016/110245 A1 | 7/2016 |
| WO | 2016/123092 A1 | 8/2016 |
| WO | 2017/020076 A1 | 2/2017 |
| WO | 2017/161310 A1 | 9/2017 |
| WO | 2018/044729 A1 | 3/2018 |
| WO | 2018/208518 A1 | 11/2018 |

OTHER PUBLICATIONS

Exhibit A: Fanout product by ADC Telecommunications, Inc., 2 pages, admitted as prior art as of Oct. 13, 2016.
Exhibit B: Fanout Product by ADC Telecommunications, Inc., 5 pages, admitted as prior art as of Oct. 13, 2016.
Exhibit C: Fanout Product by ADC Telecommunications, Inc., 7 pages, admitted as prior art as of Oct. 13, 2016.
24 Fiber Transition Housing by ADC Telecommunications, Inc., 2 pages, admitted as prior art as of Jun. 25, 2010.
Extended European Search Report for corresponding European Patent Application No. 17847270.0 dated Mar. 2, 2020, 8 pages.

FIBER OPTIC CABLE CLAMP AND CLAMP ASSEMBLY

CROSS-REFERENCE TO RELATED APPLICATION

This application is a National Stage Application of PCT/US2017/048699, filed on Aug. 25, 2017, which claims the benefit of U.S. Patent Application Ser. No. 62/381,959, filed on Aug. 31, 2016, the disclosures of which are incorporated herein by reference in their entireties. To the extent appropriate, a claim of priority is made to each of the above disclosed applications.

BACKGROUND

Telecommunications equipment containing optical fibers is known. Fiber optic cables that carry a plurality of optical fibers over distances to connect to equipment are also known. Some cables, such as trunk cables, are often configured to have a low flexibility. To help maneuver the cables around tight bends and within small places the relatively inflexible outer jacket of the trunk cable can be terminated before the end of the cable, and the end of the outer jacket coupled to a flexible conduit. The individual fibers from the cable are passed through the flexible conduit and a termination device connects the end of the cable to the telecommunications equipment. Clamps can be provided to secure the flexible conduit and/or the termination device to a chassis or wall to ensure tight connection between the cable and the telecommunications equipment and to ensure that the cable does not inadvertently disconnect from the telecommunications equipment. There is a need for improved devices for terminating trunk cables and securing them at or near their point of connection to telecommunications equipment.

SUMMARY

In one aspect of the present disclosure, a fiber optic cable clamp includes a housing comprising first and second housing halves, the housing having a fan-out portion and a flexible conduit portion, the flexible conduit portion being defined by a substantially circular cross-section, and the fan-out having a substantially rectangular cross-section.

In another aspect of the present disclosure, a fiber optic cable clamp includes a housing having a fan-out portion and a flexible conduit portion, and at least one exterior slot configured to receive a bracket arm therethrough for mounting the housing to a wall or chassis.

In another aspect of the present disclosure, a fiber optic cable clamp assembly includes at least two cable clamps, each of the cable clamps including a housing having a fan-out portion and a flexible conduit portion, and at least one exterior slot, wherein each of the at least one exterior slot of one of the clamps aligns with one of the at least one exterior slot of a second of the clamps to receive a bracket arm through the at least two aligned exterior slots for mounting the housing to a wall or chassis.

In another aspect of the present disclosure, a fiber optic cable clamp includes a housing having first and second housing halves, the housing having an exterior and an interior, each of the housing halves including an exterior anti-rotation post and an exterior anti-rotation recess.

In another aspect of the present disclosure, a fiber optic cable clamp includes a housing having first and second housing halves, the housing having a fan-out portion and a flexible conduit portion, the flexible conduit portion being defined by a substantially circular cross-section, and the fan-out portion having a substantially rectangular cross-section, the fan-out portion having a coverable opening for injecting sealant into an interior of the fan-out portion, the fiber optic cable clamp also including a cover for closing the opening.

In another aspect of the present disclosure, a fiber optic cable clamp assembly includes at least two cable clamps, each of the cable clamps including a housing having first and second exterior slots defined by first and second bridging members on opposing sides of the cable clamp, the assembly further including a bracket including a mounting portion and two arms extending from the mounting portion, each of the arms including a plurality of retaining components, and such that one of the arms is removably insertable in the first slot of all of the at least two cable clamps, such that the other of the arms is removably insertable in the second slot of all of the at least two cable clamps, the plurality of retaining components being engageable with the first and second bridging members to retain the at least two cable clamps on the bracket.

In another aspect of the present disclosure, a fiber optic cable clamp includes a housing comprising first and second housing halves, the housing having a fan-out portion and a flexible conduit portion, the flexible conduit portion being defined by a substantially circular cross-section, and the fan-out portion having a substantially rectangular cross-section configured to receive a furcation tube holder, the furcation tube holder being a comb structure having a shaft and a plurality of teeth, adjacent teeth forming an open-ended slot therebetween having a plurality of recesses for receiving a plurality of furcation tubes.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
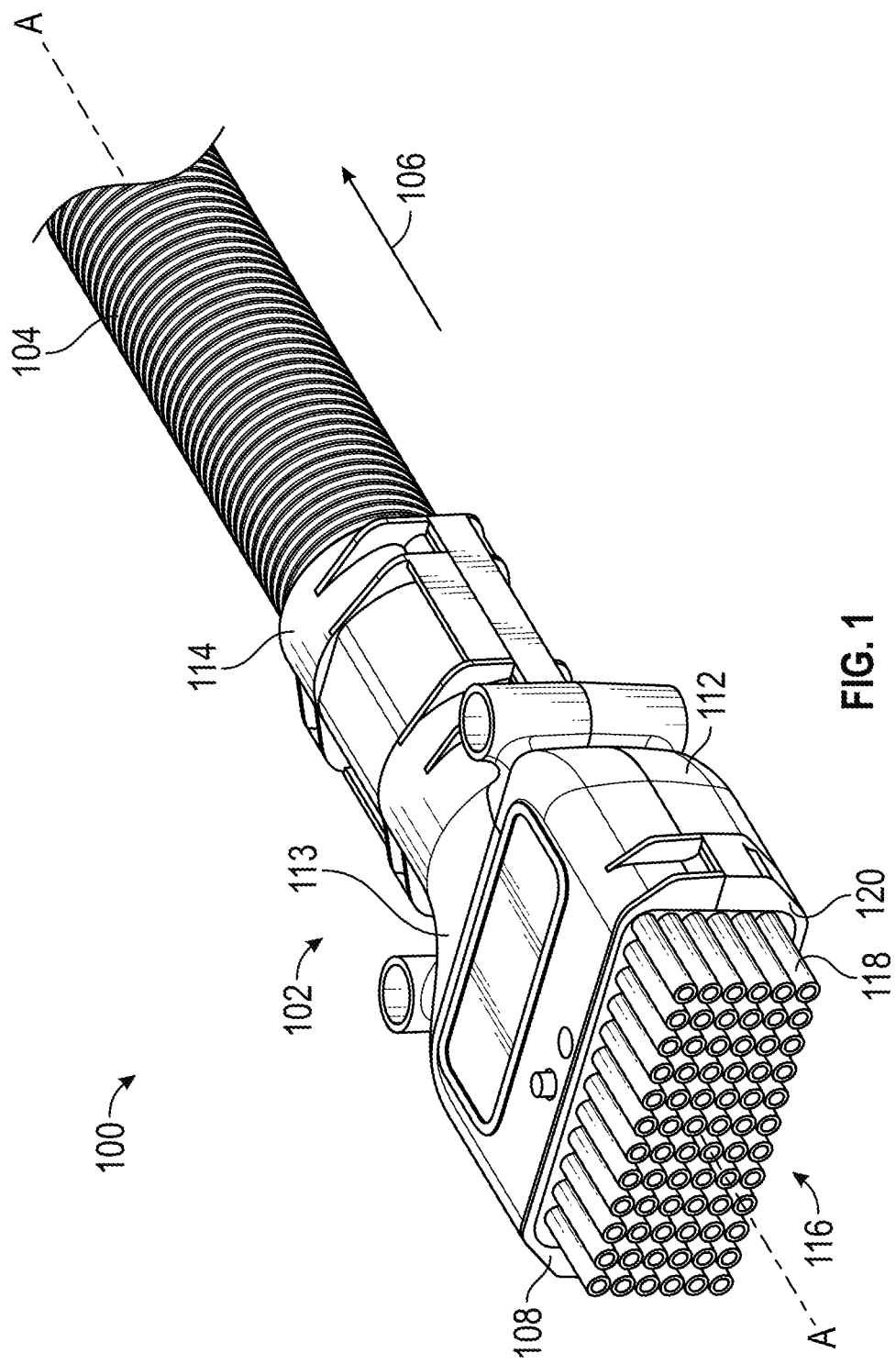
FIG. 1 illustrates a perspective view of an example fiber optic cable clamp assembly according to the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

A fiber optic trunk cable has a robust construction and can include many optical fibers. Typically such cables provide sufficient optical fiber protection, but are relatively stiff. As it pertains to this disclosure, the fiber optic cable can have an increased flexibility at an end that connects to telecommunications equipment. The increased flexibility of the cable allows for improved ease of use during installation without compromising protection of internal components (e.g., the optical fibers).

FIG. 1 illustrates a perspective view of an example fiber optic cable clamp assembly 100 according to the present disclosure. The assembly 100 includes a clamp 102 and a flexible conduit 104. The flexible conduit is a generally hollow tube that carries the optical fibers of a trunk cable. The arrow 106 in FIG. 1 points towards a distal end of the flexible conduit 104, where the flexible conduit 104 can, e.g., couple to an outer jacket of a trunk cable. In some examples, the optical fibers can be part of a ribbon cable. In other examples, the optical fibers can be loose within the flexible conduit 104. The flexible conduit 104 can be made from, e.g., metal or plastic, and can have a crush-proof construction so as to protect the optical fibers located within the conduit 104. In some examples, the flexible conduit 104 can be filled with a gel substance. The gel substance aids in weatherproofing the flexible conduit as the gel is water-blocking. The sealant can be advantageous if the fiber optic cable is installed outdoors. In some examples, the trunk cable can be filled with the gel. In other examples, the gel can be inserted into the flexible conduit 104 after the conduit is filled with optical fibers. In still other examples, the flexible conduit 104 may include the gel prior to the installation of the optical fibers within the flexible conduit 104. In other embodiments still, the flexible conduit 104 can include a port configured to receive the gel that is be inserted into the flexible conduit 104. It will be appreciated that various materials can be used to in substitute for the gel to weather proof the flexible conduit 104.

In this example, the flexible conduit 104 includes a tubular construction. In one embodiment, the tubular construction is substantially closed in a 360-degree surrounding of the internal optical fibers. In one embodiment, the tubular construction is continuous in cross-section along the full length of the flexible conduit 104. The tubular construction can have corrugations or other shapes to allow for flexibility and fiber protection from bending excessively or kinking.

The proximal end of the flexible conduit 104 couples to the clamp 102. More specifically, the clamp 102 has a front end 108 and a back end 110. A fan-out portion 112 of the clamp 102 extends rearwardly (i.e., distally) from the front end (or proximal end) 108, and a flexible conduit portion 114 of the clamp 102 extends forwardly from the back end 110. In the example depicted, the fan-out portion 112 has a substantially rectangular cross-section, the rectangle having rounded corners and defining a plane that is perpendicular to the longitudinal axis A of the clamp assembly 100. In the example shown, the long sides of the rectangular cross-section shorten in a narrowing region 113 towards the rear of the fan-out portion 112. The narrowing region 113 of the fan-out portion 112 terminates at the front of the flexible conduit portion 114.

In some examples the clamp 102 is made from a polycarbonate-ABS.

The flexible conduit portion 114 is disposed over the flexible conduit 104 to enclose the end of the flexible conduit 104. In some examples, the flexible conduit portion 114 can be secured to the flexible conduit 104, e.g., by an adhesive.

An array 116 of furcation tubes 118 projects forwardly from the front face 120 of the clamp 102. The furcation tubes 118 protect the fibers as the fibers exit the clamp 102. The lengths of the furcation tubes 118 are variable and may be different than shown, with respect to a particular use. In some examples, at least portions of the furcation tubes 118 are flexible (e.g., they can include a polymeric tubing), so a technician can direct them to selected functions. The array 116 can include any suitable configuration and any suitable number of rows and columns of furcation tubes 118. Each of the furcation tubes can be adapted to an individual fiber or a plurality of fibers, such as in the case of ribbon cables. In the example shown, the front face 120 is substantially rectangular, and the array 116 is also rectangular, consisting of six rows and twelve columns for a total of seventy-two furcation tubes, each of which can support a single optical fiber from a trunk cable for protecting the individual fiber. Thus, the clamp 102 serves to route a plurality of individual fibers from a trunk cable into individual furcation tubes. The number of furcation tubes can be selected to correspond to the number of fibers being routed from a trunk cable or other type of cable (e.g., a ribbon cable). The array 116 can be other shapes, such as round, oblong, square and so forth. Similarly, the overall shape of the fan-out portion 112 can be any of a variety of suitable shapes (e.g., round, oblong, square) to provide for a correspondingly shaped front face 120.

Figure 2:
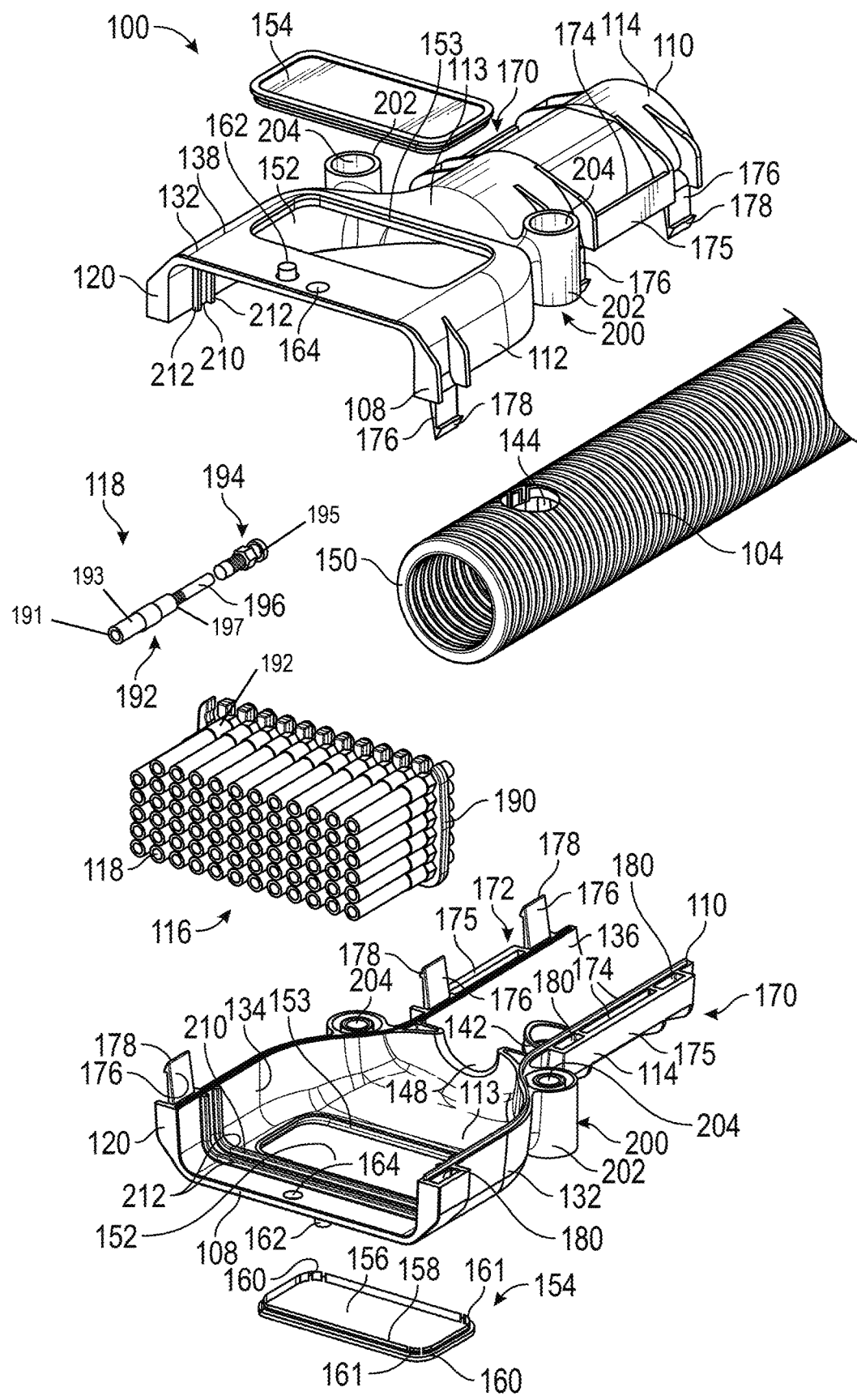
FIG. 2 is an exploded perspective view of the fiber optic cable clamp assembly of FIG. 1.

FIG. 2 is an exploded perspective view of the fiber optic cable clamp assembly 100 of FIG. 1. As illustrated in FIG. 2, the clamp includes first and second clamp halves (130, 132). In some examples, the first and second clamp halves (130, 132) have identical constructions for, e.g., more efficient manufacturing. In the example shown, each of the fan-out portion 112 and the flexible conduit portion 114 of each of the first and second clamp halves (130,132) includes an interior wall (134, 136) and an exterior wall (138, 140). One or more retention bosses 142 projects from the interior wall 136 of the flexible conduit portion 114 to retainably mate with one or more correspondingly positioned retention hole 144 disposed in the wall of the flexible conduit 104 for securing the flexible conduit 104 within the flexible conduit portion 114 of the clamp 102. In addition, a barrier wall 146 disposed approximately between the flexible conduit portion 114 and the fan-out portion 112 provides an opening 148 for fibers to pass from the flexible conduit portion 114 to the fan-out portion, while preventing forward movement of the flexible conduit 104 into the fan-out portion 112. Thus, the diameter of the opening 148 is smaller than the diameter of the front 150 of the flexible conduit 104.

In this example, each of the clamp halves (130, 132) includes a coverable port 152 extending through the exterior wall (138,140) and the interior wall (134, 136). The port can be any desired shape. In the example shown, the port 152 is rectangular with rounded corners and is disposed forward of the narrowing region 113. A cover 154 is provided that is configured to snappingly engage a ridge 153 that surrounds or partially surrounds the port 152. A lip 158 extending from the underside 156 of the cover 154 is configured to snappingly engage the ridge 153. The lip 158 can be flexible such that it deforms slightly as the cover initially engages the ridge 153 as the cover 154 is pressed into the port 152. Once the lip 158 clears the ridge 153, the lip 158 recovers its original form to snappingly engage the ridge 153 and secure the cover 154 in the port 152. As shown in FIG. 2, the lip 158 can be segmented with gaps 160 separating adjacent segments. In this example, relatively small segments 161 are disposed at the corners of the cover 154 to provide release points for more easily removing the cover 154 from the port 152, e.g., by inserting a tool, such as a screw driver head, at the corner to bend the relatively small segments 161, enabling the cover 154 to be pried off.

The port 152 provides convenient and closable access to the interior of the fan-out portion 112 to, e.g., ensure that fibers are properly routed to furcation tubes and to fill the fan-out portion with a sealant (e.g., an epoxy) for sealing the fibers therein.

Each of the clamp halves (130, 132) includes an anti-rotation post 162 and an anti-rotation recess 164. The anti-rotation post 162 projects from the exterior wall (138, 140), while the anti-rotation recess is recessed within the exterior wall (138, 140). In some examples, the anti-rotation recess 164 is a hole that passes through the exterior wall (138, 140) and the interior wall (134, 136). When multiple clamps 102 are arranged side by side, the anti-rotation post 162 of one clamp is positioned for insertion in the anti-rotation recess 164 of an adjacent clamp, and vice versa, helping to prevent rotation of one clamp relative to another clamp when the anti-rotation posts are inserted in the anti-rotation recesses.

The flexible conduit portion 114 of each of the clamp halves (130, 132) includes mounting portions (170, 172) on opposing sides of the flexible conduit portion 114. On one side, the mounting portion 172 includes a bracket slot 174 disposed between two clamp tabs 176. On the opposing side, the mounting portion 170 includes a bracket slot 174 disposed between two clamp slots 180. The clamp slots on one half of the clamp are aligned with the clamp tabs on the other half of the clamp when the clamp halves are connected to form a complete clamp body. A bridge 175 defines the outer limit of each of the bracket slots 174.

The clamp tabs 176 are resiliently flexible and include an outwardly facing lip 178. The clamp tabs 176 of one clamp half are inserted in the clamp slots 180 of another clamp half. The angle of the clamp slots 180 compared to the angle of the unflexed clamp tabs 176 causes the clamp tabs to flex inward (i.e., towards the interior of the clamp 102) while the lip 178 is within the clamp slot 180. Once the lip 178 passes all the way through the clamp slot 180, the lip 178 returns to its unflexed configuration to snappingly engage the mounting portion 170 of the other clamp half.

The fan-out portion 112 on each clamp half also includes a clamp tab 176 with lip 178 on one side and a clamp slot 180 on the opposing side for mating with the corresponding slot/tab on the fan-out portion 112 of the other half. In other examples, more or fewer clamp tabs and corresponding slots can be provided on the clamp halves. When the clamp tabs of one clamp half engage the clamp slots of the other clamp half as described above, the two clamp halves (130, 132) are attached to form a complete clamp body.

The bracket slots 174 on one half of the clamp 102 align with the bracket slots 174 on the other half of the clamp 102 when the two clamp halves are connected together. The aligned bracket slots 174 on either side of the flexible conduit portion 114 of the clamp are configured to receive bracket arms for mounting multiple clamp assemblies 100 to a chassis or wall, as described further below.

The furcation tube array 116 is in a furcation tube holder 190, which will be described in greater detail below. On the interior wall (134, 136) of each clamp half, a groove 210 is formed between two ribs 212 formed about an entire interior perimeter of the fan-out portion 112 of the clamp 102 when the clamp halves (130, 132) are connected together. One or more portions of the groove 210 receives one or more portions of the outer edge of the furcation tube holder 190 to help hold the furcation tube holder 190 in place within the clamp 102.

Each furcation tube 118 has a front end 191 that, in some examples, can be connected to, e.g., a fiber optic connector, such as a SC, LC, or MPO connector. Such fiber optic connectors enable fibers from the trunk cable to connect to telecommunications equipment, the fibers first passing through the flexible conduit 104, the clamp 102, and the furcation tubes 118, which organize the fibers such that their terminal ends can be connected to other fibers via the fiber optic connectors. Each furcation tube 118 includes an outer tube 193, an inner tube 196, a crimp ring 192 and a hub portion 194. The hub portion 194 mounts to the back end 197 of the outer tube 119, and the furcation tube 118 is secured together using the crimp ring 192. An annular groove 195 in the hub portion 194 is slotted into the furcation tube holder 190 as described further below, to hold the furcation tube 118 in place.

In one example method of assembling a cable clamp assembly 100 in accordance with the present disclosure, in one method step the flexible conduit 104 is loaded into the flexible conduit portion 114 of one half 132 (e.g., a bottom half) of the clamp 102, such that the retention boss 142 of the clamp half 132 nests in one of the retention holes 144 of the flexible conduit 104, and such that the front 150 of the flexible conduit 104 abuts the barrier wall 146. In another method step, the furcation tubes 118 are loaded into the furcation tube holder 190. In another method step, the furcation tube holder 190, holding the furcation tubes 118 in an array 116, is loaded into the groove 210 in the clamp half 132. In another method step, the other clamp half 130 is aligned with the clamp half 132 and the two halves are connected together by engaging the clamp tabs 176 with the clamp slots 180, as described above, and such that the retention boss 142 of the clamp half 130 nests in another retention hole 144 of the flexible conduit 104. In another method step, individual fibers passing through the flexible conduit 104 are routed into furcation tubes 118. Routing of the fibers can be performed before or after the second clamp half 130 is connected to the first clamp half 132. One or both of the ports 152 can assist in accessing the fibers and/or observing the routing of the fibers into their respective furcation tubes 118. In another method step, sealant is introduced into the fan-out portion 112 of the clamp 102 via one or both of the ports 152 (in some examples, the sealant is also allowed to dry/harden/cure) in order to seal the fibers within the clamp 102. In another method step the covers 154 are placed and locked in the ports 152 to cover the ports 152 (it should be appreciated that the covers 154 can be locked into the ports 152 at the same time as each other or at different times). In some examples, one of the two ports 152 can be used for observation/monitoring while sealant is introduced through the other of the two ports 152. In some examples, just one of the ports 152 is used for both observation/monitoring and sealant introduction, and the other of the ports 152 is closed with a cover 154 earlier during the assembly to prevent leakage of sealant (e.g., in the case of a liquid sealant having relatively low viscosity).

Each clamp half (130, 132) includes additional clamp coupling means 200 that correspond with the clamp coupling means on the other half. In this example, the clamp coupling means 200 includes a fastener housing 202 disposed on the exterior wall (138, 140) on either side of the clamp 102. In the example shown the additional clamp coupling means 200 protrude from opposing sides of the narrowing region 113 of the fan-out portion 112. The fastener housing 202 houses a through-hole 204 for receiving a pin or screw. In other examples, more or fewer holes can be provided than as shown in the figures. The through-holes 204 on one clamp half (130, 132) align with the through-holes 204 on the other clamp half when the clamp halves are connected together. In addition, when coupling multiple clamps 102 together, e.g., in a single bracket as described below, the through-holes 204 of one clamp are aligned with the through-holes 204 of the adjacent clamp when the anti-rotation post 162 of one clamp is nested within the anti-rotation recess 164 of the adjacent clamp. In this way, long pins or screws can be inserted through the through-holes 204 of adjacent clamps to couple the adjacent clamps together, and/or to, e.g., a chassis or wall.

Figure 3:
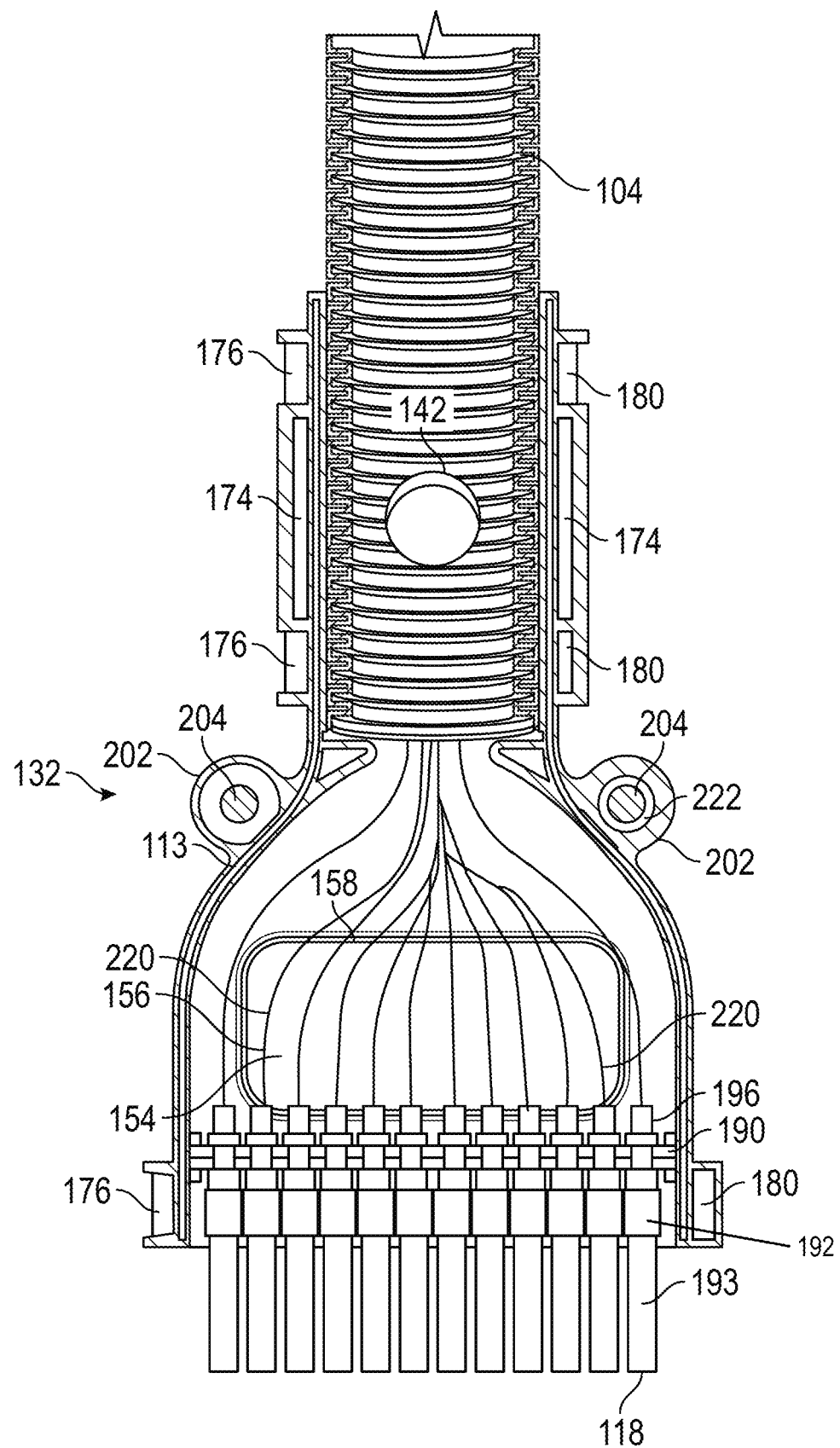
FIG. 3 is a top view of a single clamp half of FIG. 1 showing a loaded flexible conduit, a loaded furcation tube holder with furcation tubes, and a plurality of fibers routed to their respective furcation tubes.

FIG. 3 is a top view of a single clamp half 132 of FIG. 1 showing a loaded flexible conduit 104, a loaded furcation tube holder 190 with furcation tubes 118, and a plurality of fibers 220 routed to their respective furcation tubes 118. The figure illustrates the clamp half 132, the furcation tubes 118 having the inner tube 196, the outer tube 193, and crimp ring 192, the flexible conduit 104, the clamp tabs 176, the clamp slots 180, the furcation tube holder 190, the cover 154 with underside 156 and lip 158, the barrier wall 146, the front 150 of the flexible conduit 104 (abutting the barrier wall 146), the retention boss 142, the bracket slots 174, and the fastener housings 202 with through-holes 204, as described above. As shown in FIG. 3, the fibers 220 are routed to individual furcation tubes 118. In addition, in this example, the fastener housing 202 on one side of the clamp half 132 includes a boss 222 that aligns and nestingly mates with a corresponding hole in the other clamp half 130 as an additional coupling and/or aligning means between the clamp halves 132 and 130.

Figure 4A:
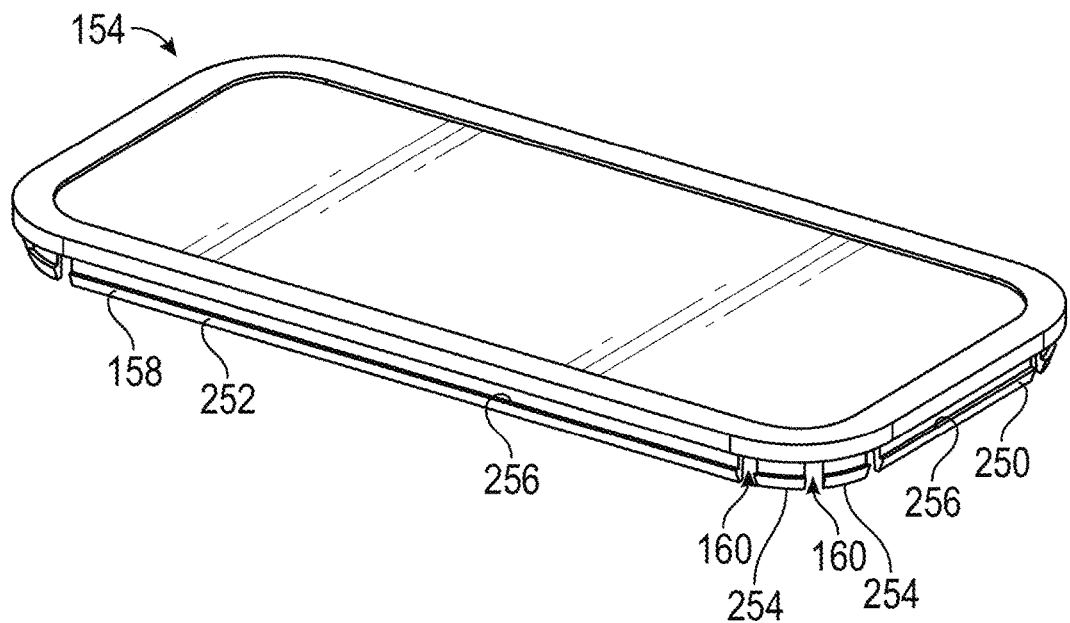
FIG. 4A is a perspective view of the example cover of FIG. 2.
Figure 4B:
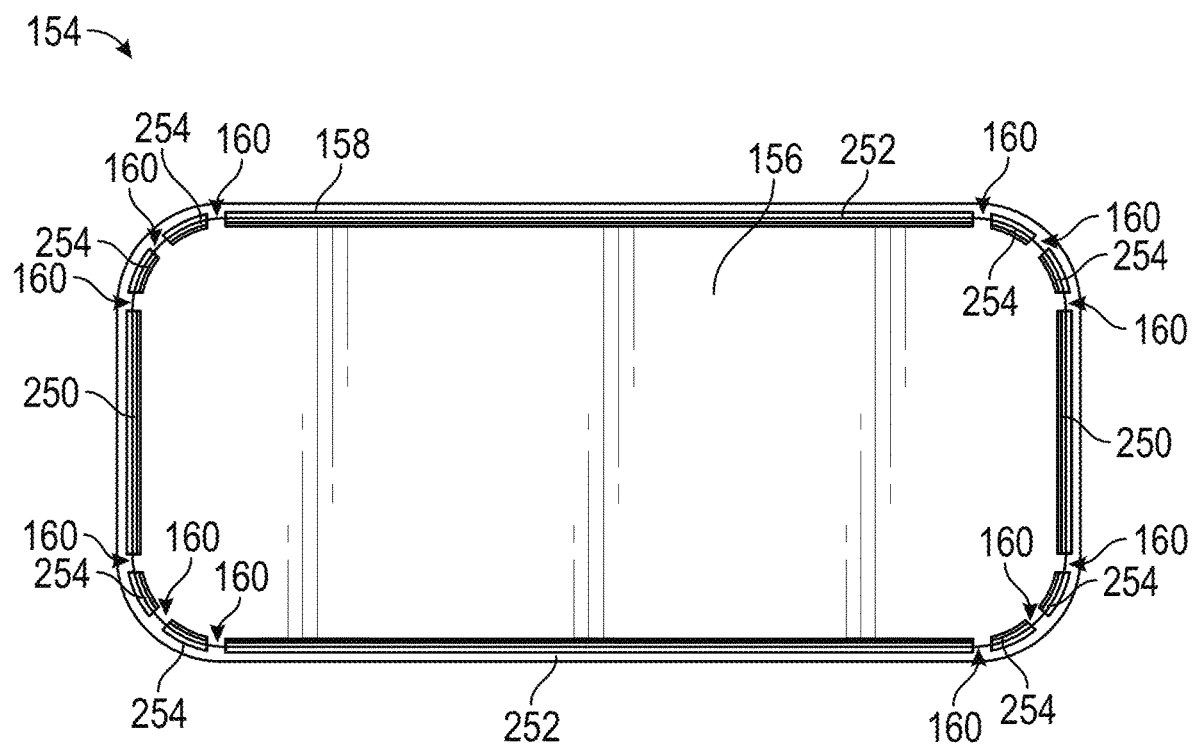
FIG. 4B is a bottom view of the example cover of FIG. 2.

FIG. 4A is a perspective view of the cover 154 of FIG. 2. FIG. 4B is a bottom view of the cover 154 of FIG. 2. Referring to FIGS. 4A and 4B, the cover 154 includes the underside 156, the lip 158, and the gaps 160 as described above. In this example, the lip 158 includes two longitudinal segments 250, two latitudinal segments 252, and two corner segments 254 at each of the four corners of the cover 154. Between any two adjacent segments (250, 252, 254) is a gap 160. In addition, as more clearly shown in FIG. 4A, each segment (250, 252, 254) of the lip 158 includes a ledge 256. The ledge 256 faces outward (i.e., away from the center of the cover 154). As the cover 154 is inserted in the port 152 of the clamp 102, the segments of the lip 158 resiliently flex until the ledge 256 of the segments clears the ridge 153 surrounding the port 152. The ledge 256 then snappingly engages over/under the ridge 153 to secure the cover 154 to the clamp 102. In some examples the cover 154 is made from a polycarbonate-ABS.

Figure 5A:
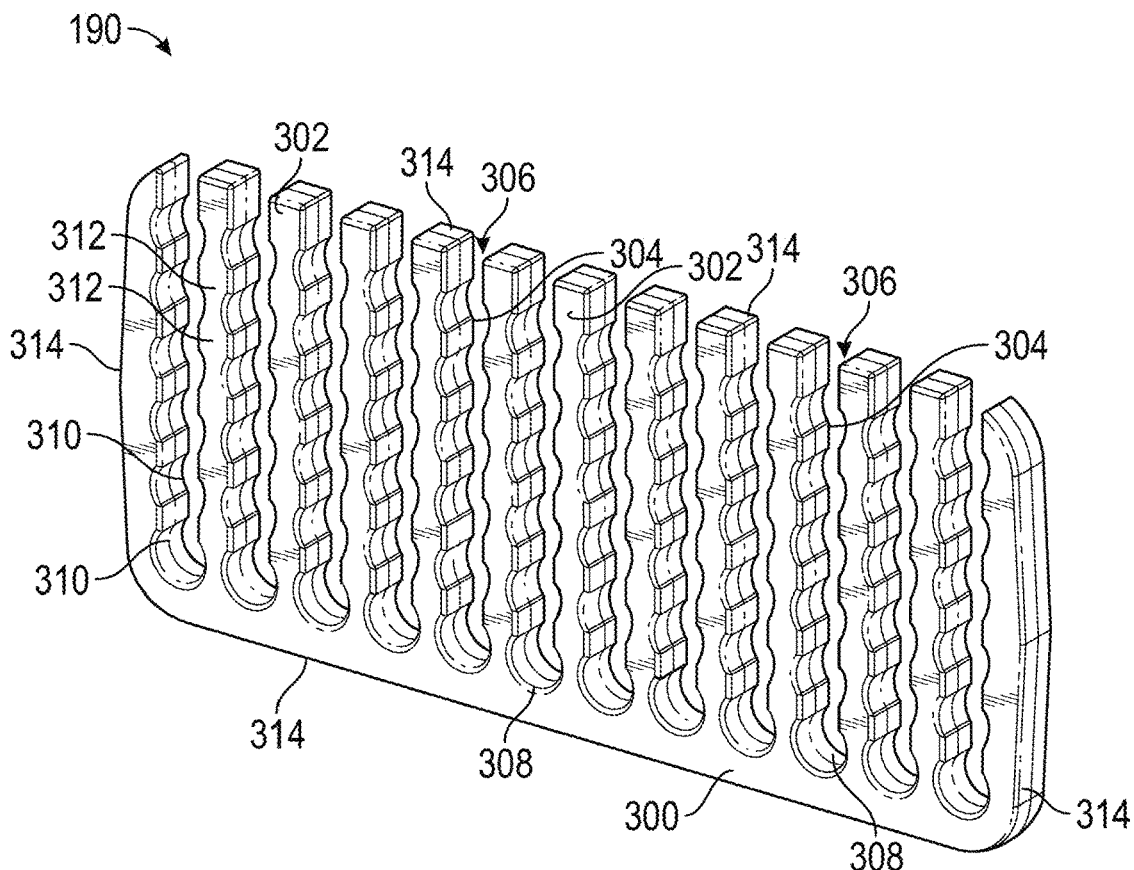
FIG. 5A is a perspective view of the example furcation tube holder of FIG. 2.
Figure 5B:
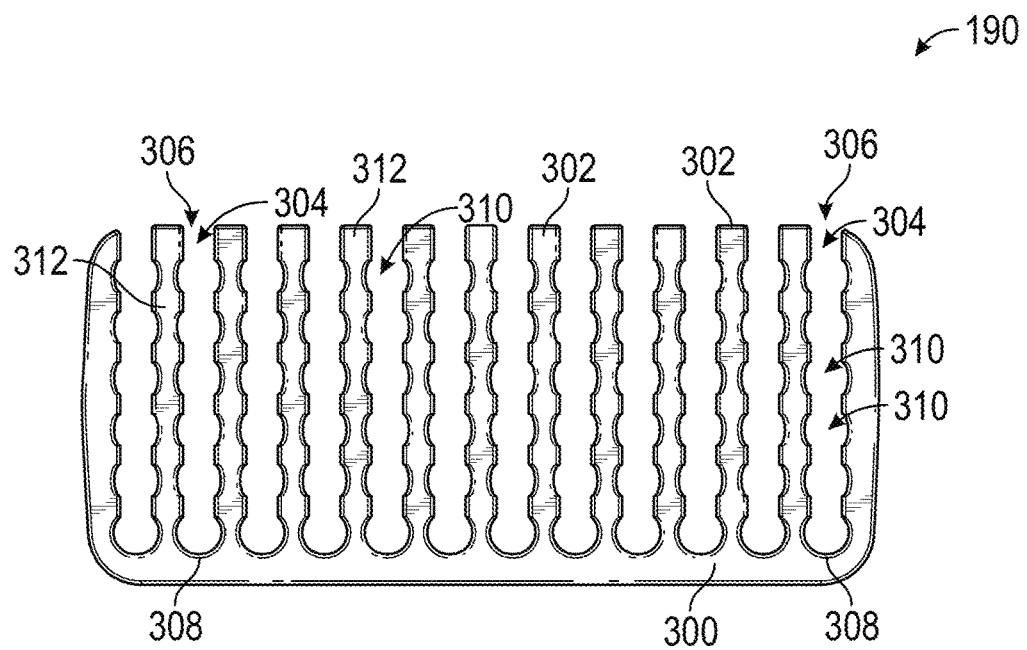
FIG. 5B is a front view of the example furcation tube holder of FIG. 2.

FIG. 5A is a perspective view of the furcation tube holder 190 of FIG. 2. FIG. 5B is a front view of the furcation tube holder 190 of FIG. 2. Referring to FIGS. 5A and 5B, the furcation tube holder 190 is a comb structure that includes a shaft 300 and a plurality of teeth 302. A slot 304 between each pair of adjacent teeth 302 has an open end 306 and a closed end 308, the closed end 308 being closed off by the shaft 300. In this example, each of the slots 304 includes a plurality of recesses 310, each of which is configured to receive and hold a furcation tube 118 as described above. Relatively wide portions 312 of the teeth 302 between the recesses 310 help to prevent movement of a furcation tube out of its recess. Furcation tubes are loaded into the recesses 310 via the open ends 306 of the slots 304. The teeth 302 can be resiliently flexible, allowing furcation tubes, while being loaded into the furcation tube holder 190, to be pushed past the relatively wide portions 312 until the furcation tube reaches the desired recess 310. The perimeter edge 314 of the furcation tube holder 190 is shaped and sized to securely fit within the groove 210 in the fan-out portion 112 as described above. In some examples the furcation tube holder 190 is made from a polycarbonate-ABS.

Figure 6:
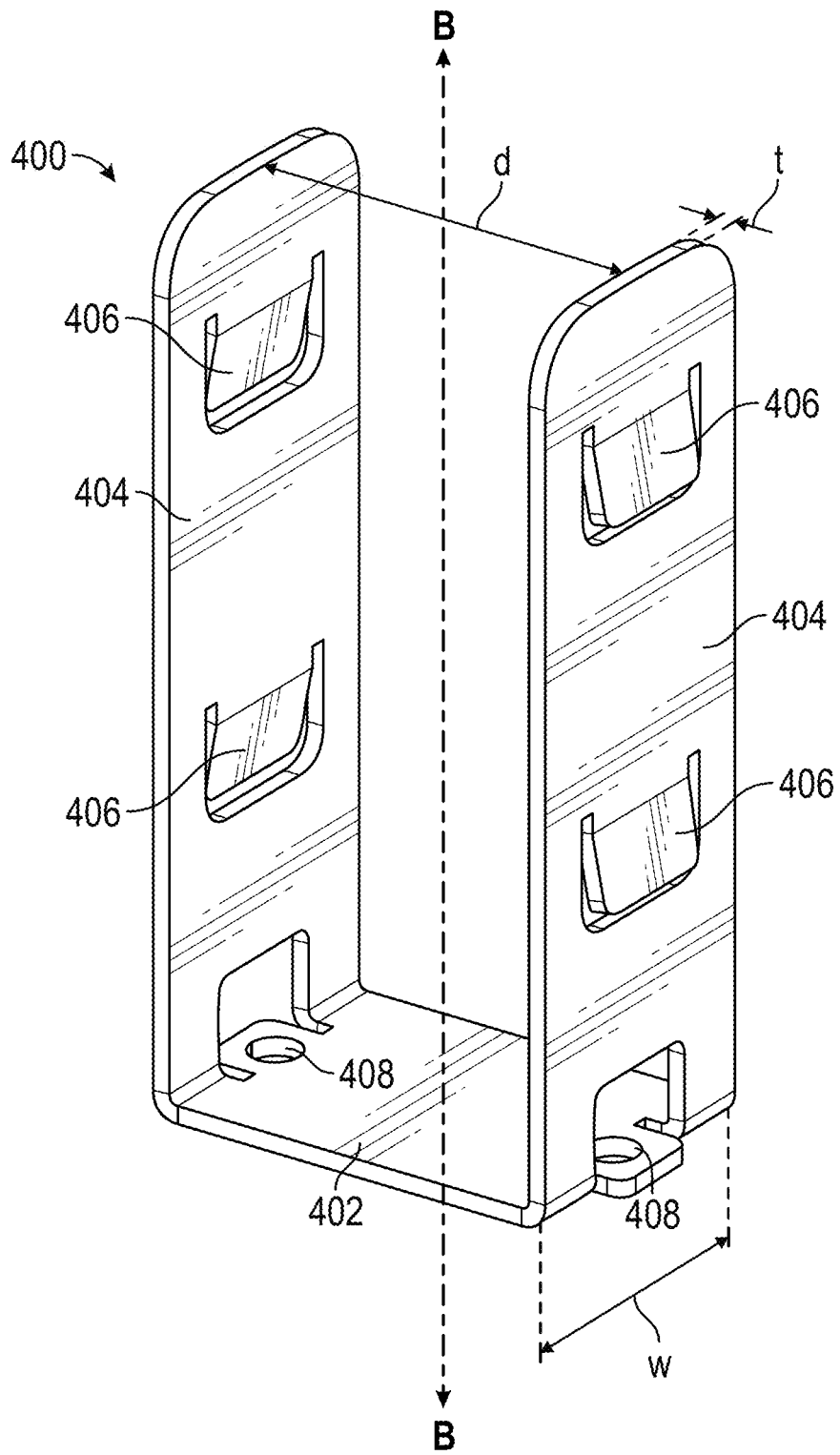
FIG. 6 is a perspective view of an example bracket for use with multiple of the clamp assembly of FIG. 1.

FIG. 6 is a perspective view of an example bracket 400 for use with multiple clamp assemblies 100 of FIG. 1. The bracket 400 includes a mounting portion 402 and two arms 404 extending from the mounting portion 402. Each of the arms 404 includes a plurality of clamp retaining components 406. In this example, the clamp retaining components are resiliently flexible tabs that, in their unflexed configuration, protrude outward from their respective arm 404 away from the central axis B of the bracket 400, but can be resiliently flexed inward toward the central axis B before reassuming their unflexed configuration. The mounting portion 402 includes a mounting component for mounting the mounting portion 402 to, e.g., a chassis or wall. In this example, the mounting component includes two mounting holes 408 that receive fasteners (e.g., bolts or screws), for mounting the bracket 400 to, e.g., a wall or chassis. The arms 404 are configured for removable insertion in the bracket slots 174 of the clamp 102 as described above, and as shown and described below in connection with FIG. 7. For example, the distance d between the arms 404 matches the distance between the bracket slots 174, and the thickness t of the arms 404 is selected such that the arms 404 can be inserted in the bracket slots 174. In addition, the width w of the arms can be selected to match or approximately match the width of the bracket slots 174, to reduce or prevent sliding of the bracket 400 within the bracket slots 174 once the bracket arms 402 have engaged the bridges 175 of the clamp 102. In some examples, the bracket 400 is made at least partially from sheet metal.

Figure 7:
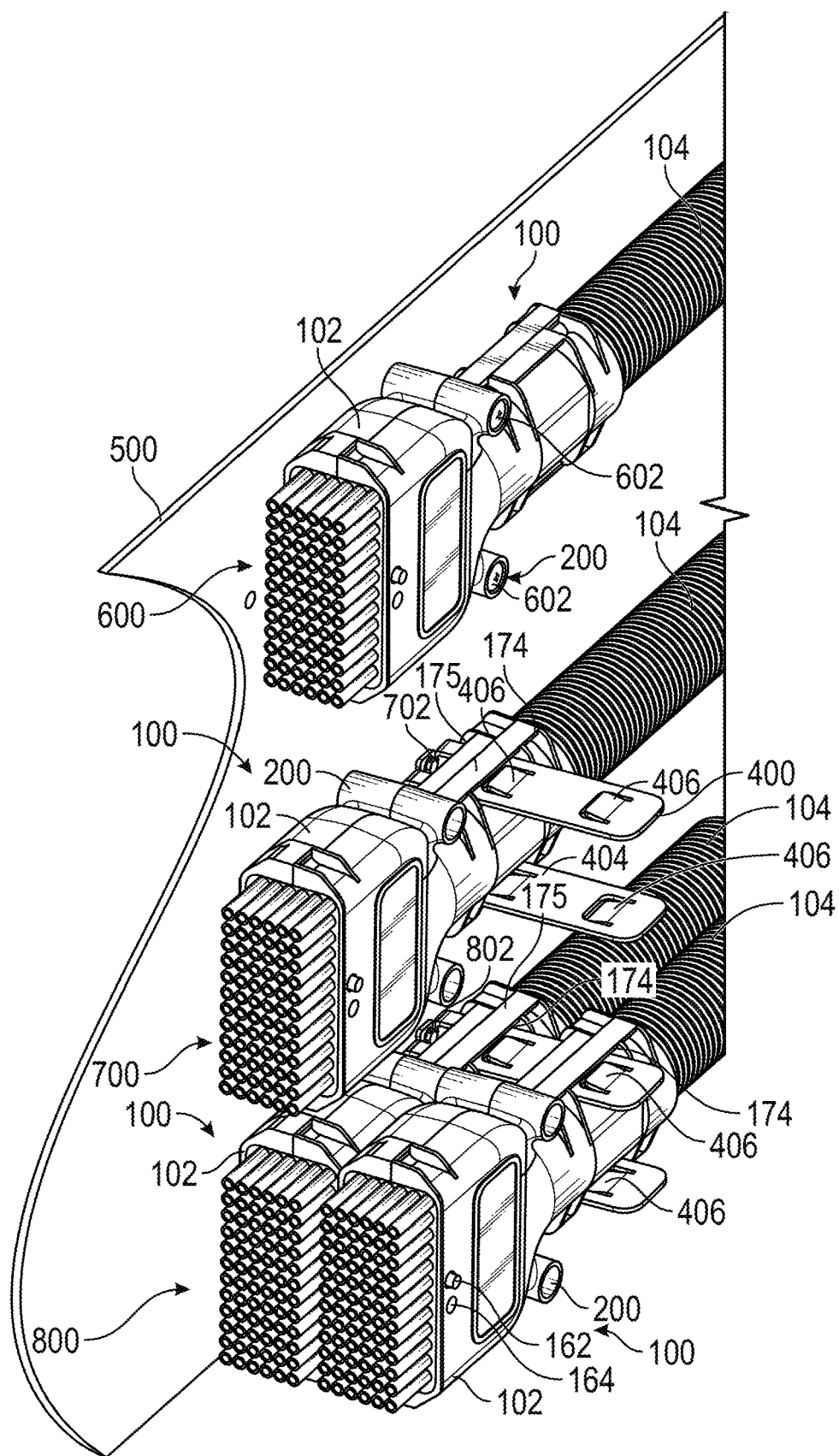
FIG. 7 illustrates different ways of a mounting one or multiple of the clamp assembly of FIG. 1 to a chassis or wall.

FIG. 7 illustrates different example ways of mounting one or multiple of the clamp assemblies 100 of FIG. 1 to a wall 500. In a first configuration 600, screws 602 are inserted through the clamp coupling means 200 and into screw holes (not shown) in the wall 500.

In a second configuration 700, a bracket 400 is secured to the wall 500 with screws or other fasteners 702, and the arms 404 of the bracket 400 are inserted through the bracket slots 174 of a single clamp 102 until the desired pair of tabs 406 engages the bridges 175 of the clamp 102 to hold the clamp 102 in place. The clamp 102 can be removed from the bracket 400 by pressing the flexibly resilient tabs 406 inward until they no longer engage the bridges 175 of the clamp 102, and then sliding the clamp 102 off the bracket 400. Optionally, as a further securing means, screws or other fasteners are also inserted through one or both of the clamp coupling means 200 of the clamp 102 and into screw holes (not shown) in the wall 500.

In a third configuration 800, a bracket 400 is secured to the wall 500 with screws or other fasteners 802, and the arms 404 of the bracket 400 are inserted through the bracket slots 174 of two clamps 102 until the desired pair of tabs 406 engage the bridges 175 of each clamp 102 to hold the clamp 102 in place. The substantially rectangular cross section of the fan-out portions 112 of the clamps 102 helps to mount adjacent clamps 102 together in this way. The clamps 102 can be removed from the bracket 400 by pressing the flexibly resilient tabs 406 inward until they no longer engage the bridges 175 of the clamps 102, and then sliding the clamps 102 off the bracket 400. Optionally, as a further securing means, screws or other fastening means are also inserted through one or both of the clamp coupling means 200 of both clamps 102 and into screw holes (not shown) in the wall 500. Though not shown, an anti-rotation post 162 of one of the clamps 102 mates with an anti-rotation recess 164 of the other clamp 102, and vice versa.

It should be appreciated that more or fewer clamp coupling means 200 can be provided on the clamps 102. Some of the clamp coupling means 200 can include fasteners that assist in holding the two clamp halves together only, while others of the clamp coupling means 200 can include longer fasteners that secure one clamp 102 to a wall or chassis or even longer fasteners that secure more than one clamp 102 to a wall or chassis. It should also be appreciated that the bracket 400 can be modified to accommodate and securely hold more than two cable clamps 102 (e.g., three, four, five or more cable clamps) by extending the arms 404 and including additional pairs of resilient tabs 406 on the arms 404.

From the foregoing detailed description, it will be evident that modifications and variations can be made in the devices of the disclosure without departing from the spirit or scope of the invention.

What is claimed is:

1. A fiber optic cable clamp comprising:
    first and second clamp halves each defining a first fan-out portion configured to route a plurality of optical fibers to telecommunications equipment, and a second portion extending from the first fan-out portion and configured to secure an end of a flexible conduit carrying optical fibers, each of the first fan-out portion and the second portion of each of the first and second clamp halves comprising an exterior wall and an interior wall; and
    at least one slot disposed on the exterior wall of at least one of the second portions, the at least one slot configured to receive a bracket arm for mounting the clamp.

2. The fiber optic cable clamp of claim 1, wherein the first fan-out portions each have a substantially rectangular cross-section perpendicular to a longitudinal axis of the clamp, and wherein the second portions each have a substantially round cross-section perpendicular to the longitudinal axis of the clamp.

3. The fiber optic clamp of claim 1, wherein each of the second portions includes two slots on opposing sides of the corresponding exterior wall, the slots being configured to receive two bracket arms.

4. A fiber optic clamp assembly comprising at least one of the fiber optic cable clamp of claim 3 and a bracket, the bracket comprising a mounting portion and the two bracket arms extending from the mounting portion, each of the two bracket arms comprising a plurality of flexibly resilient tabs, the flexibly resilient tabs configured to engage bridge elements that define the slots.

5. The fiber optic clamp assembly of claim 4, comprising two of the fiber optic cable clamp, wherein pairs of the plurality of flexibly resilient tabs engage the bridge elements of both of the fiber optic clamps, the slots of one of the two fiber optic clamps being aligned with the slots of the other of the two fiber optic clamps.

6. The fiber optic clamp assembly of claim 5, wherein each of the fiber optic clamps comprises a pair of fastener housings protruding from the exterior wall of the corresponding first fan-out portions, each of the fastener housings comprising a through hole for receiving a fastener, wherein each of the pair of fastener housings of one of the clamps is aligned with one of the pair of fastener housings of the other of the clamps, and wherein each of two fasteners is inserted through both of the fiber optic cable clamps.

7. The fiber optic cable clamp of claim 1, wherein each of the first fan-out portions includes a narrowing region abutting the corresponding second portion.

8. The fiber optic cable clamp of claim 1, further comprising a barrier wall configured to abut the end of the flexible conduit.

9. The fiber optic cable clamp of claim 1, further comprising a furcation tube holder disposed in a groove on an interior surface of the first fan-out portions.

10. The fiber optic cable clamp of claim 9, wherein the furcation tube holder is a comb structure comprising a shaft, a plurality of teeth defining a plurality of slots therebetween, wherein each of the slots comprises a plurality of recesses, and wherein each of the recesses is configured to hold a single furcation tube.

11. The fiber optic cable clamp of claim 10, wherein each of the slots comprises a closed end and an open end for loading furcation tubes into the slot.

12. The fiber optic cable clamp of claim 10, wherein each of the furcation tubes is configured to route a single optical fiber to the telecommunications equipment.

13. The fiber optic cable clamp of claim 10, wherein the recesses are arranged in the furcation tube holder to hold a rectangular array of furcation tubes.

14. The fiber optic cable clamp of claim 1, wherein each of the clamp halves comprises a plurality of clamp slots and a plurality of clamp tabs, and wherein the clamp tabs of one of the clamp halves are configured to lock in the clamp slots of the other of the clamp halves, and wherein the clamp tabs of the other of the clamp halves are configured to lock into the clamp slots of the one of the clamp halves.

15. The fiber optic cable clamp of claim 1, wherein the interior wall of each of the second portions comprises a retention boss configured to nest in a retention hole of the flexible conduit.

16. The fiber optic cable clamp of claim 1, further comprising a plurality of fastener housings protruding from the exterior wall of each of the fan-out portions, each of the fastener housings comprising a through hole for receiving a fastener.

17. The fiber optic cable clamp of claim 1, wherein the exterior wall of the first fan-out portion of each of the first and second halves comprises an anti-rotation post and an anti-rotation recess, wherein each of the anti-rotation posts is configured to mate with an anti-rotation recess of another fiber optic cable clamp, and wherein each of the anti-rotation recesses of the first and second halves is configured to mate with an anti-rotation post of another fiber optic cable clamp.

18. The fiber optic cable clamp of claim 1, wherein the first clamp half has an identical construction to the second clamp half.

19. The fiber optic cable clamp of claim 1, further comprising a coverable port disposed in the first fan-out portion of each of the first and second clamp halves; and a cover for each of the coverable ports, each of the covers being snappingly engageable with one of the ports.

20. The fiber optic cable clamp of claim 1, further comprising a flexible conduit secured to the second portions.

21. A fiber optic cable clamp comprising:
first and second clamp halves defining a first fan-out portion configured to route a plurality of optical fibers to telecommunications equipment and a second portion extending from the first fan-out portion and configured to secure an end of a flexible conduit carrying the optical fibers, each of the first fan-out portion and the second portion of each of the first and second clamp halves comprising an exterior wall and an interior wall;
a coverable port disposed in each of the first and second clamp halves in the first fan-out portion of the clamp;
and a cover for each of the coverable ports, each of the covers being snappingly engageable with one of the ports.

22. The fiber optic cable clamp of claim 21, wherein each of the covers comprises a flexibly resilient lip projecting from an underside of the cover, the lip comprising a ledge configured to snappingly engage a ridge surrounding each of the coverable ports.

23. The fiber optic cable clamp of claim 22, wherein the flexibly resilient lip comprises a plurality of segments and a gap between each pair of adjacent segments.

24. The fiber optic cable clamp of claim 23, wherein each of the covers comprises a shape that is substantially a rounded rectangle, and wherein the flexibly resilient lip comprises at least one longitudinal segment, at least one latitudinal segment, and at least one corner segment.

25. A fiber optic cable connection assembly comprising:
a trunk cable supporting a plurality of optical fibers;
a flexible conduit having a first end coupled to the trunk cable and a second end;
a bracket comprising a mounting portion and at least one arm extending from the mounting portion;
a cable clamp having a first end connected to the flexible conduit and a second end opposite the first end, the cable clamp comprising first and second clamp halves defining a first fan-out portion configured to route a plurality of optical fibers to telecommunications equipment and a second portion extending from the first fan-out portion, the clamp further comprising at least one slot disposed on an exterior wall of the second portion, the at least one slot configured to receive one of the at least one bracket arm for mounting the clamp; and
a plurality of furcation tubes extending past the second end of the clamp and away from the first end of the clamp and supporting the plurality of optical fibers, the furcation tubes being configured to connect the plurality of optical fibers to telecommunications equipment via fiber optic connectors.

* * * * *